April 17, 1962 W. G. AXTELL 3,029,915
LUGGAGE CASE

Filed Jan. 21, 1959 3 Sheets-Sheet 1

INVENTOR.
WILLARD G. AXTELL
BY
Horace B. Van Valkenburgh
ATTORNEY

April 17, 1962 W. G. AXTELL 3,029,915
LUGGAGE CASE
Filed Jan. 21, 1959 3 Sheets-Sheet 2
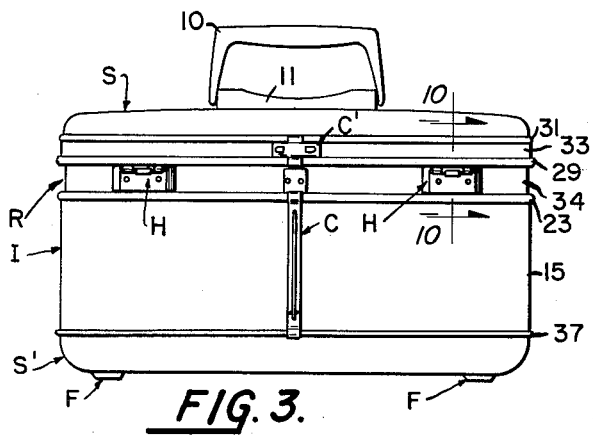
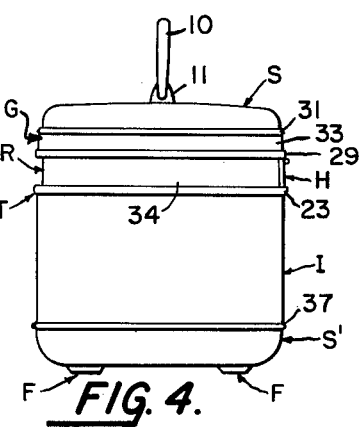
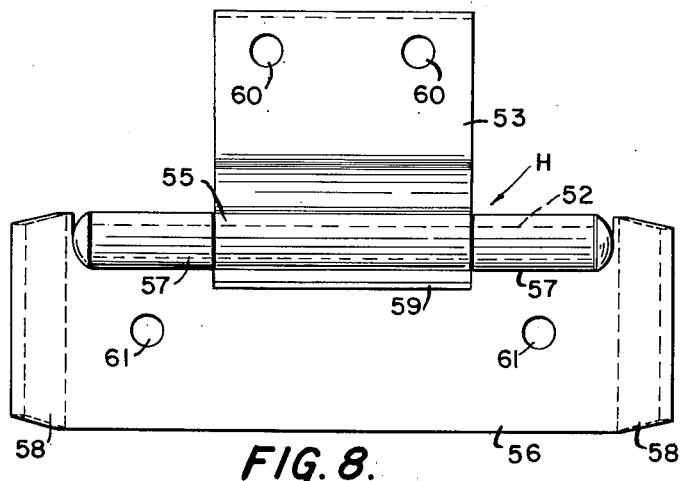
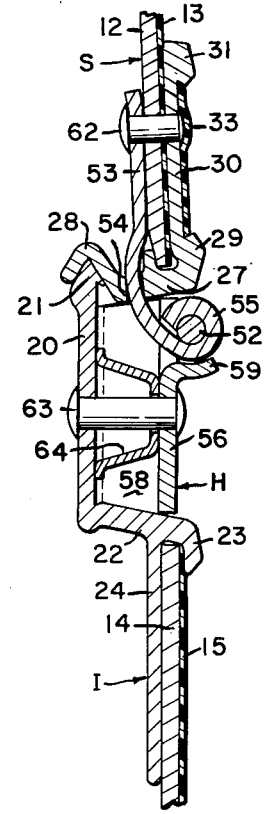
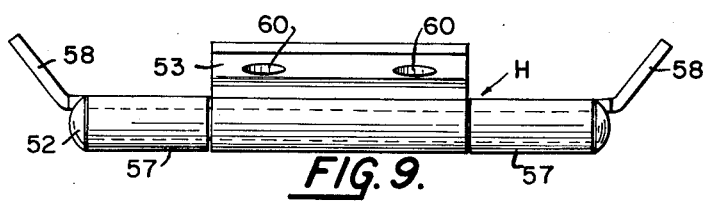
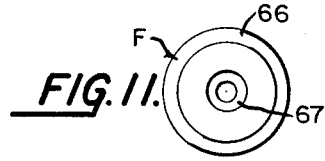
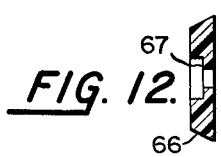
INVENTOR.
WILLARD G. AXTELL
BY
Horace B. Van Valkenburgh
ATTORNEY April 17, 1962 W. G. AXTELL 3,029,915
LUGGAGE CASE
Filed Jan. 21, 1959 3 Sheets-Sheet 3

INVENTOR.
WILLARD G. AXTELL
BY
Horace B. VanValkenburgh
ATTORNEY

United States Patent Office 3,029,915
Patented Apr. 17, 1962

3,029,915
LUGGAGE CASE
Willard G. Axtell, Denver, Colo., assignor to Shwayder Bros., Inc., Denver, Colo., a corporation of Colorado
Filed Jan. 21, 1959, Ser. No. 788,168
10 Claims. (Cl. 190—49)

This invention relates to luggage cases.

As pointed out in my copending application Serial No. 785,880, filed January 9, 1959, now U.S. Patent 2,950,793, a luggage case may be formed from two concave sections, which are hinged together and in which a metal strip extends around the confronting edge of each section, the strips being adapted to interfit with the sections closed, while a concave shell may be attached to each strip. Such a shell may be formed of metal covered with a layer of wear resistant material, such as plastic, or may be a molded shell, such as formed from a resin or plastic provided with a filler. However, the edge of each such a shell must be protected, since a plastic layer adhered to metal is more readily separated at the edge of the shell, while a molded shell may be seriously damaged by an impact or blow against the edge thereof. Also, the depth and the curvature of a molded shell is limited by the resistance thereof to shock. An aluminum or magnesium alloy sheet can be drawn to a hollow or shell shape and may be provided with a wear resistant layer, such as a vinyl resin layer having a desired color and also a pattern embossed thereon, such as to simulate leather, cloth, or the like. Such a vinyl sheet may be readily bonded to a flat strip or sheet of aluminum or magnesium alloy, but difficulties are encountered when such a bonded layer is attempeted to be formed into a curved hollow shell, particularly at the corners. Thus, the depth of such shells is limited, from a practical standpoint. A shell of limited depth can also be made by first drawing a sheet of light metal, such as magnesium alloy, to the desired shape, then heating an embossed vinyl sheet and pulling the same down against the metal shell by vacuum. An adhesive, of course, is applied to the vinyl sheet so that it will adhere to the metal.

As also disclosed in my copending application Serial No. 785,880, now Patent No. 2,950,793, the locks, hinges or other hardware may be disposed within a recess formed by the interfitting strips and one of the strips may be provided with a tongue to form the bottom of such a recess. Also, the exposed surface of the strips may be provided with a shallow, longitudinal recess, as in the tongue and a laterally extending flange, in which a strip of non-metallic, wear resistant material, conveniently the same material as the covering of the shell, may be secured, so as to expose as little as possible of the metal of the strip which tends to become marred from scratching, scuffing or the like. Train cases, cosmetic cases and the like, in which the case is provided with a concave base section of considerable depth and a concave top section of considerably less depth, present additional problems. While the top section may be constructed in the manner of my copending application Serial No. 785,880, now Patent No. 2,950,793, the base section presents considerable problems, owing to the relatively greater depth thereof, as compared with its width and length.

Among the objects of the present invention are to provide a novel luggage case; to provide such a luggage case which is particularly adapted to be utilized as a train case, cosmetic case and the like; to provide such a luggage case which may be made relatively light in weight, as by the use of a light weight metal; to provide such a luggage case which will have excellent wearing qualities, such as by the use of a wear resistant layer on metal; to provide such a luggage case in which a minimum of metal is exposed to wear; to provide such a luggage case which may be provided with rounded or curved surfaces at all corners; to provide such a luggage case which may include hollow shells having curved corners and formed of light weight metal to which a layer of plastic is applied, or formed by molding, as from a resin and a filler, and wherein the edges of the shells are protected; to provide such a luggage case in which at least one section may have a depth greater than its width; to provide such a luggage case in which locks, hinges and the like may be mounted in protected positions; to provide such a luggage case which may be made in various sizes; and to provide such a luggage case which may be readily produced and will be durable in use.

Additional objects and the novel features of this invention will become apparent from the description which follows, taken in connection with the accompanying drawings, in which FIG. 1 is a front elevation of a luggage case constructed in accordance with this invention;

FIG. 3 is a rear elevation, on a reduced scale, of the luggage case of FIG. 1;

FIG. 4 is an end elevation, on a reduced scale, of the luggage case of FIG. 1;

FIG. 8 is a rear elevation of a hinge, on an enlarged scale;

FIG. 9 is a top plan view of the hinge of FIG. 8;

FIG. 10 is a fragmentary cross section, on an enlarged scale, taken along line 10—10 of FIG. 3 and showing the installation of the hinge of FIG. 8;

FIG. 11 is a bottom plan view of a supporting foot;

FIG. 12 is a cross section of the supporting foot of FIG. 11; and

As illustrated in FIGS. 1–4, a luggage case constructed in accordance with this invention may include a concave top section comprising a concave shell S attached to and having its edges protected by a groove strip G, and a base section comprising a lower shell S', conveniently similar to shell S, attached to the lower edge of a hollow, intermediate shell I, whose upper edge is attached to a tongue strip T, adapted to interfit with the groove strip G when the case is closed. The tongue strip and groove strip may be constructed to provide a recess R extending around the luggage case, in which may be installed an elongated latch structure L at the front, as in FIG. 1, and a pair of hinges H at the rear, as in FIGS. 3 and 4. As will be evident, the hinges H pivotally connect the upper and lower case sections together at the rear, while the latch structure L is adapted to attach the sections of the luggage case together at the front, when in closed position. For carrying purposes, a handle 10 may be attached to a handle support 11, in turn attached to the top of shell S. As will be evident, the top shell S, base shell S' and intermediate shell I may have rounded corners, which add to the attractiveness of the luggage case. Also, the tongue strip T and groove strip G correspond in contour to the upper edge of intermediate shell I and the lower edge of top shell S, respectively. The luggage case may be supported by a series of feet F, such as four in number, disposed adjacent the four rounded corners of the base shell S', as will be evident from FIGS. 3 and 4, while the handle 10 may be pivotally attached to handle support 11, so as to be readily movable between the upright or carrying position of FIGS. 1, 3 and 4 and the down or rest position of FIG. 2, or a down or rest position opposite to that shown in FIG. 2.

Figure 6:
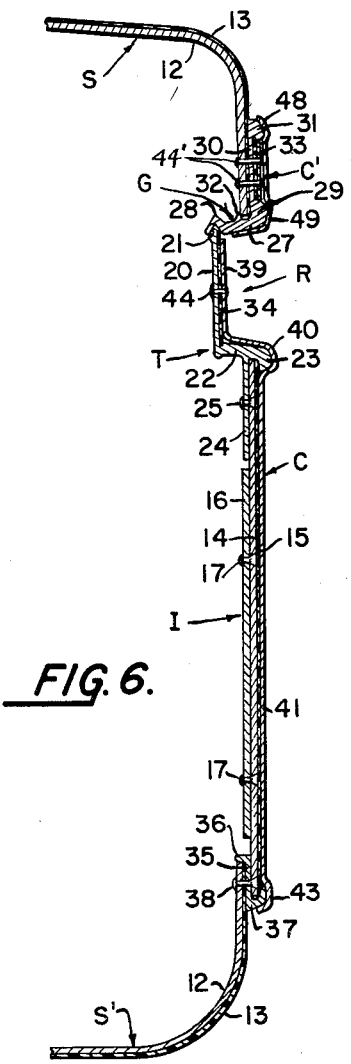
FIG. 6 is a fragmentary vertical section, taken along line 6—6 of FIG. 5.

As in FIG. 6, each shell S and S' may be formed from a metal layer or shell 12, such as aluminum or magnesium alloy, covered on the outside with a plastic layer 13, such as a vinyl resin which may be embossed to provide a desired pattern, so as to simulate leather, cloth or the like, the plastic layer 13 also being adapted to have any desired color. The hollow intermediate shell I may consist of a metal layer or hollow shell 14, such as of aluminum or magnesium alloy, covered on the outside by a plastic layer 15, similar to layer 13. The metal of layers 12 and 14 may be of a suitable thickness, such as on the order of 0.032 inch, while the plastic of layers 13 and 15 may be thinner, such as on the order of 0.015 inch, although metal and plastic layers of other and different thickness may be used. Each shell S and S' is concave, being hollow on the inside and also the corners thereof conveniently being rounded, but the peripheral edge of each shell is protectd in a manner described later. Shells S and S' may also be formed shells, such as a molded shell formed of a mixture of thermosetting resin to impart rigidity and a thermoplastic resin to impart toughness and resilience, together with a filler, as of cellulose fibers. Such a formed shell may conveniently be thicker than a shell formed of a metal layer covered with a plastic layer, such as on the order of 0.090 inch and also thicker at the rounded corners. The shells S and S' may be made by first drawing a sheet of light metal into the desired shape, to form the metal layer or shell 12, then heating an embossed vinyl sheet and pulling the same down against the metal shell by vacuum, to provide plastic layer 13. The vinyl sheet and metal sheet may be slightly larger than necessary and trimmed off after the vinyl is applied to the metal, while an adhesive is applied therebetween so that the vinyl sheet will adhere to the metal. The metal layer 14 of the hollow intermediate shell I may be formed from a strip of light metal formed to shape and the meeting edges attached together, as by a fish plate 16 of FIG. 6 which is conveniently attached by countersunk head rivets 17, which are hidden by the plastic layer 15. The metal layer 14 of the intermediate shell I, when so formed, may be first attached to the adjacent parts and plastic layer 15 applied later, in a manner described later.

As in FIGS. 6 and 10, the tongue strip T may include a tongue or flange 20 which extends upwardly with the case in its normal upright position, conveniently provided along its upper edge with a pointed end or edge 21 and from the lower edge of which extends a lateral flange 22, conveniently inclined slightly outwardly and downwardly to form the lower wall of the recess R. The outer edge of flange 22 may be shaped to form a lip or bead 23 which extends outwardly and downwardly. From a point on flange 22 spaced inwardly from lip 23, a depending flange 24 may extend downwardly, to which the upper edges of intermediate shell I may be attached, as by a series of countersunk head rivets 25, the heads of which are covered by plastic layer 15. As will be evident, a recess or groove is formed between lip 23 and flange 24 to receive the upper edge of shell I, so that this upper edge is disposed in a protected position. The groove strip G may include a wall 27 which is inclined slightly upwardly to form the upper wall of recess R and the inner edge of which may be formed as an angular flange 28 adapted to interfit with the pointed edge 21 of tongue 20. The outer edge of wall 27 may be formed as a bead 29, while a flange 30 may extend upwardly therefrom and be provided at its upper edge with a bead 31. For the purpose of positioning and holding the edge of shell S in position, the upper edge of wall 27, inside the case, as in FIG. 6, may be provided with a flange 32 extending therearound in spaced relation to flange 30, while the lower edge of shell S may be attached to flange 30 by a series of countersunk head rivets similar to rivets 25. The opposed inner edges of beads 29 and 31 may be undercut, as in FIG. 10, to receive a strip 33, preferably of non-metallic material having wear resistant qualities and conveniently formed of the same plastic as layer 13. In addition, tongue 20 may also be covered with a strip 34 of wear resistant material, conveniently the same material as strip 33 and layer 13, while the upper and lower edges of strip 34 may extend into undercut grooves at edge 21 of tongue 20 and at the junction between tongue 20 and wall 22. Strips 33 and 34 may extend completely around the luggage case, with the abutting ends thereof disposed at the rear, conveniently at the center, and may be secured to the respective flange 30 and tongue 20 by a suitable adhesive, preferably water proof.

The beads 23, 29 and 31 may have a rounded or any other suitable configuration, such as that shown, so as to provide a desirably pleasing appearance. Each of the tongue strip T and groove strip G may be formed of light metal, as indicated previously, such as aluminum or magnesium alloy, each strip being conveniently formed by extruding through a die having an orifice corresponding to the cross sectional shape of the respective strip. Each strip may be cut to length and bent at appropriate places to form the four rounded corners, with the ends of each abutting at the rear of the case. When groove strip G is attached, as by rivets, to the lower edge of shell S, the shell tends to maintain the groove strip in shape. Also, when the tongue strip T is attached to the upper edge of the intermediate shell I, the shell I tends to maintain the tongue strip in its formed shape.

The lower shell S' may be attached to the intermediate shell I by a Z-bar 35 of FIG. 6, which extends completely around the joint between the shells and may be provided at its upper edge, on the inside, with an inwardly extending flange 36 against which the upper edge of shell S' may be abutted for positioning purposes. Along its lower edge, on the outside, bar 35 may be provided with a hook shaped flange or bead 37, adapted to receive the lower edge of metal layer 14 of the intermediate shell and also plastic layer 15. The metal layer 14, bar 35 and shell S' may be attached together by a series of rivets 38, which conveniently have a countersunk head on the outer side, so that the head will be hidden by plastic layer 15. For the sake of appearance, the exposed surface of the lower end of bar 35 and flange 37 preferably has a shape complementary to that of bead 23, although any other desired shape may be utilized, preferably a shape which will provide a pleasing appearance. After the intermediate shell I has been assembled to bar 35 and lower shell S' and also to the tongue strip T, the plastic layer 15, in strip form and cut to desired dimensions, is fitted into position and an adhesive, preferably water proof, used to attach layer 15 to metal layer 14. As will be evident, the upper edge of strip 15 extends beneath bead 23, while the lower edge of strip 15 extends beneath or into an undercut at the upper inner edge of flange 37. Thus, both the upper and lower edges of strip 15 are protected from accidental impacts or blows.

Figure 5:
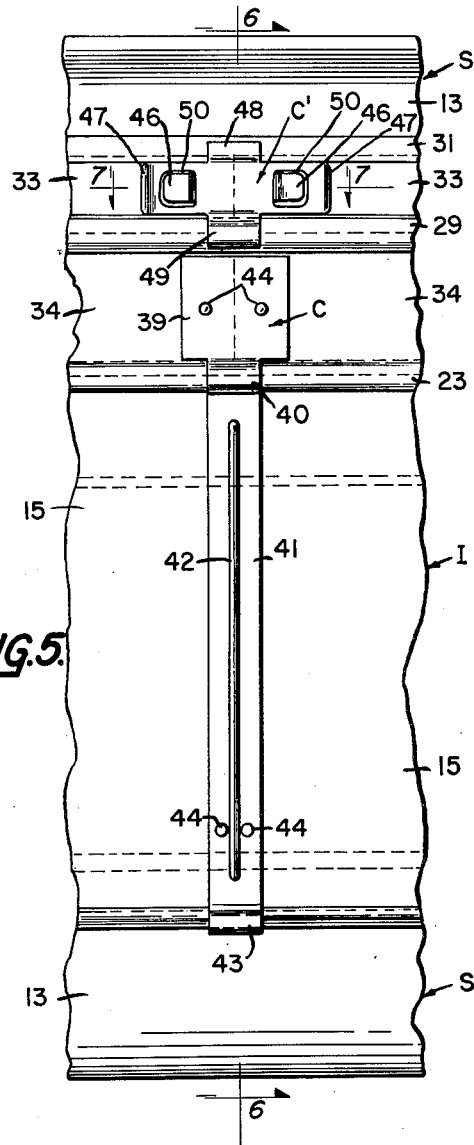
FIG. 5 is a fragmentary elevation, on an enlarged scale, of the central portion of the rear of the lugage case of FIG. 1 with a slight modification.

In order to protect the joints at the abutting ends of strip 34 and plastic layer 15, a clip C of FIGS. 5 and 6 may be installed at the rear, the clip including a flange 39 covering the abutting ends of strip 34, a flange 40 extending over and conforming in shape to wall 22 and bead 23, a strip portion 41 covering the abutting ends of layer 15 and provided with an outwardly extending rib 42 to add strength, and a flange 43 extending over and conforming in shape to the bead or flange 37 of Z-bar 35. The clip C may be attached to tongue 20 and to intermediate shell I by rivets 44. The flange 39, disposed on tongue 20, may be wider than the remainder of the clip, in order to produce a more pleasing appearance, particularly when a clip C' is used to cover the abutting ends of strip 33.

Figure 7:
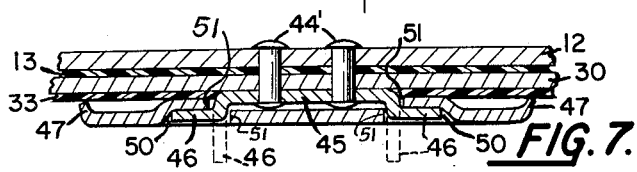
FIG. 7 is a fragmentary section, on an enlarged scale, taken along line 7—7 of FIG. 5.

Clip C' may be mounted on a base plate 45 which is adapted to act as a fish plate to connect the abutting ends of groove strip G together, base plate 45 being provided with ears 46 which extend outwardly, as in the dotted position of FIG. 7 when the base plate is first installed, but which are afterward bent over in a manner described later. Base plate 45 may be attached to groove strip G within the recess between beads 29 and 31, as by rivets 44', and may remain attached to the groove strip G with the ears 46 extending directly outwardly, until the strip 33 is installed. The ends of strip 33 need merely extend to the ends of base plate 45 as in FIG. 7, since the ends of strip 33 will be covered by the clip C'. Clip C' may be a plate which rests against the ends of rivets 44' and may be provided at each end with an inwardly extending flange 47, each of which clamps strip 33 tightly. Clip C' may further be provided with an upper flange 48, which extends over and conforms in shape to bead 31, and a lower flange 49, which extends over and conforms to the shape of bead 29 and also wall 27. Clip C' may also be provided with a pair of oppositely disposed, inwardly offset sections or depressions 50, with a slot 51 at the inner edge of each depression, so that ears 46 of base plate 45 may extend outwardly through the respective slots 51 and, after clip C' has been placed in position, the ears 46 may be bent inwardly and into the depressions 50, to secure clip C' to base plate 45.

Each hinge H, as in FIGS. 8–10, is conveniently pivotal about a pin 52, which is conveniently adjacent the outer edge of wall 27, so that the top section of the case will pivot about an axis permitting engagement and disengagement of the tongue strip T with groove strip G easily. One half of each hinge H may be formed as a plate 53 which extends through a slot 54 in the wall 27 of groove strip G and is provided with an ear 55 which surrounds the central portion of pin 52. The other half of hinge H may be formed as a plate 56, having a pair of ears 57 surrounding the end portions of pin 52 and outwardly inclined, lateral flanges 58 which clamp against strip 34 and have tapered sides to correspond to the lateral contour of recess R, as well as an outwardly extending flange 59 which accommodates ear 55 of plate 53 and provides a stop to prevent opening of the hinges more than a desired amount, as by abutment against bead 29 of groove strip G. Each hinge plate 53 and 56 may be provided with holes 60 and 61, respectively, shown in FIG. 8, by which the hinge plate may be attached to the respective tongue and groove strip, as in FIG. 10. Thus, hinge plate 53 may be attached to groove strip G by rivets 62, conveniently hidden beneath strip 33, while hinge plate 56 may be attached to tongue 20 of tongue strip T by rivets 63, with a generally conical bell 64 being placed around each rivet 63 to act as a spacer and maintain hinge plate 56 in the desired position. As will be evident from FIG. 10, each hinge H is generally within recess R and thus is not only in a protected position but also is at least partially hidden from view, thus adding to the appearance of the luggage case.

Each foot F, as in FIGS. 11 and 12, may be circular as shown, or may have any other desired shape. Each foot F is conveniently provided with a tapered edge 66 and a central, countersunk hole 67, the latter being adapted to receive a rivet or any other suitable attaching device, by which the foot may be attached to the underside of lower shell S'. Each foot F is conveniently molded from the relatively stiff plastic known as "Ethocell," although any other suitable material may be used.

Figure 13:
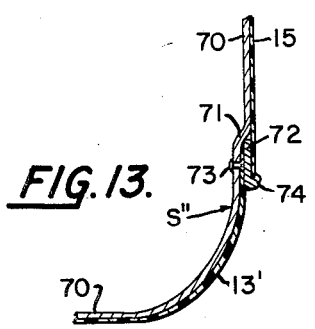
FIG. 13 is a fragmentary cross section, corresponding to the lower portion of FIG. 6, but illustrating an alternative construction.

In the alternative construction illustrated in FIG. 13, the upper section of the case may be similar to that previously described and the lower section of the case may include tongue strip T, but attached to the upper edge of a shell S", which may include a metal layer or shell 70 drawn to shape so that its upper portion corresponds to metal layer 14 of intermediate shell I and its lower portion corresponds to metal layer 12 of the shell S'. However, in shell S", these two metal layers are integral and connected together at a band or offset 71, immediately below which is installed a metal strip 72, extending around the lower section of the case and attached to metal shell 70, after a plastic layer 13', corresponding to plastic layer 13 of FIG. 6, is attached to the lower portion of the shell, corresponding to shell S' of FIG. 6, as in the manner previously described. Strip 72 may be attached to shell S" by a series of rivets 73 having countersunk heads on the outside, so as to be hidden by strip 15. Metal strip 72 is provided along its lower edge with a bead 74, conveniently complementary in shape to bead 23 for the sake of appearance and preferably undercut along its upper edge to receive the lower edge of strip 15, which may be applied in the manner previously described.

The interior of the luggage case may be provided with a lining, pockets around the inside of the lower case section, a mirror on the inside of the upper case section, and a tray adapted to receive desired articles, in a manner conventional with cosmetic cases, train cases and the like. The tray may be supported by brackets which are attached to flange 24 of tongue strip T and the tray may occupy a position within the space bounded by the tongue 20. Of course, other and different inside appurtenances may be utilized.

Figure 1:
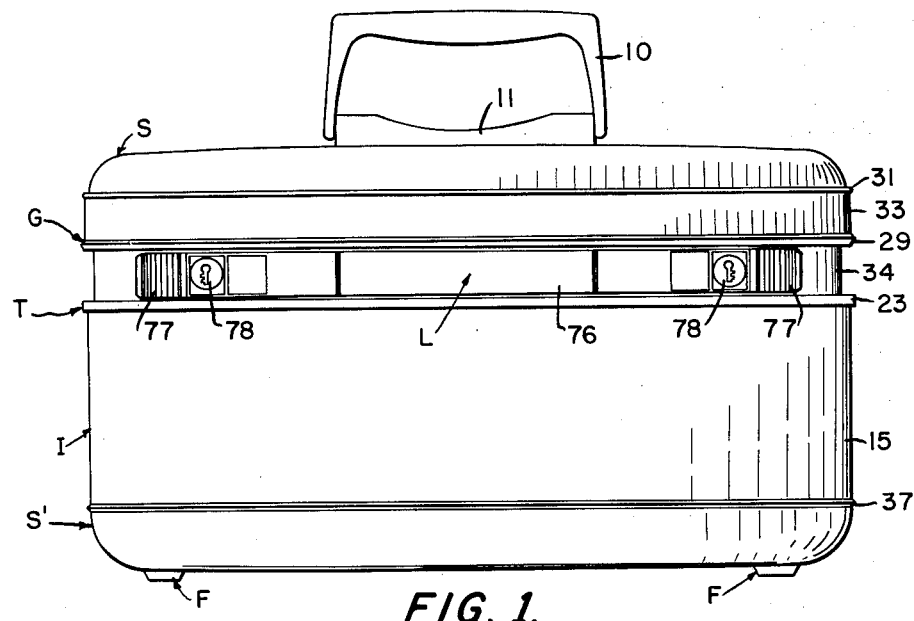
Figure 2:
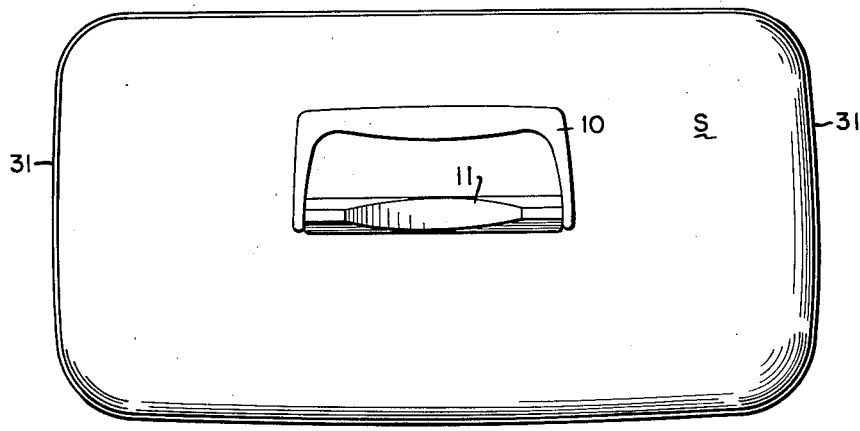
FIG. 2 is a top plan view of the luggage case of FIG. 1.

The latch structure L may be constructed in the manner disclosed and claimed in the copending application of Lee F. Garmon, Jr., and Willard G. Axtell, Serial No. 790,675, filed February 2, 1959, thus including a housing 76 within each end of which a draw bolt or slide is movable by a lever 77. Each lever 77 in its open position may extend outwardly from recess R, but in its closed position, as in FIG. 1, is within recess R, as will also be evident from FIG. 2. Each lever 77 may be provided with a lock for securing the same in closed position, as by a key insertable in a slot having an appropriate position in a lock cylinder 78. In general, each slide may be appropriately constructed so that, with the two halves of the case closed, each slide will engage a hook or catch attached to the groove strip G on the opposite half of the case, when the respective lever 77 is moved to the closed position of FIG. 1.

Although a preferred form of this invention and certain variations have been illustrated and described, it will be understood that other forms may exist and various changes made therein, all without departing from the spirit and scope of this invention.

What is claimed is:

1. A luggage case comprising opposed concave sections which meet at the edges thereof when the case is closed, each section including a strip of metallic material which extends around the confronting edge of the respective section, said strips being constructed and arranged to interfit when the case is closed; a first concave shell of one section attached to one said strip with the edge of said first shell being disposed behind a portion of said strip; a hollow intermediate shell of the other section having one end attached to the opposite strip with a portion of said opposite strip extending over the edge of said intermediate shell; a second concave shell attached to the opposite end of said intermediate shell; and a bar extending between the edge of said second shell and the corresponding edge of said intermediate shell and provided with an outwardly extending bead at its exposed edge, said intermediate shell being formed of a layer of metal provided with a layer of non-metallic material on the exterior surface thereof and extending beneath said bead.

2. A luggage case as defined in claim 1, wherein said bar is provided on the inside with a flange against which the edge of said second shell may abut.

3. A luggage case comprising upper and lower, opposed concave sections which meet at the edges thereof when the case is closed, said lower section having a depth greater than the upper section and each section including a strip formed of metallic material extending around the confronting edge of said section, said strips being constructed and arranged to interfit and to provide a recess extending longitudinally around the case when the case is closed; hinge means disposed in said recess at the rear of the case and pivotally connecting the case sections together, each said hinge means being provided with a stop adapted to abut one of said strips to limit the opening of said case section; latch means disposed in said recess at the front of the case; and handle means attached to the top of the upper section of said case.

4. A luggage case comprising upper and lower, opposed concave sections which meet at the edges thereof when the case is closed, each said section including a strip formed of metallic material which extends around the confronting edge of said section and a concave shell attached to the respective strip; the strip of said lower case section having an upwardly extending tongue, an outwardly extending wall and a flange extending downwardly from said wall, with the shell of said lower case section being attached to said flange; the strip of said upper case section having an outwardly extending wall provided at its inner edge with means adapted to interfit with the upper edge of said tongue when said case is closed, a flange extending upwardly from said wall and a shallow, longitudinally extending recess in the outer surface of said flange, said shell of the upper case section being attached to said flange; a strip of nonmetallic material in said recess in said upper strip flange; a strip of nonmetallic material on the outer surface of said tongue; and a clip covering the abutting ends of each of said strips of nonmetallic material.

5. A luggage case as defined in claim 4, wherein said upper strip is provided with a longitudinal, outwardly extending bead at each edge of said recess; said clip of said upper case section comprises a plate having upper and lower flanges extending onto said beads, an inverted angular flange at each end, with the edge of each said angular flange clamping said strip of nonmetallic material in said recess, an inwardly offset depression at each side of the center thereof, and a slot at the inner edge of each depression; and a base plate for said clip attached to each end of said upper strip and an ear extending outwardly through the corresponding slot in said clip and then laterally within the corresponding depression.

6. A luggage case as defined in claim 4, wherein the outer edge of the wall of said lower case section strip is provided with an outwardly extending bead and said lower case section extends inwardly therearound at a position spaced from the bottom thereof; a second metal strip extending around said lower section below said inwardly extending position and provided with an outwardly extending bead along its lower edge; an intermediate strip of nonmetallic material extending around said lower case section between said lower strip bead and over said second metal strip and to said bead thereof; and the clip for said lower case section comprises a flange disposed against the abutting ends of said strip of nonmetallic material on said tongue, a flange which extends outwardly on said wall and over onto said lower strip bead, a portion extending downwardly over the abutting edges of said intermediate strip of nonmetallic material, and a flange extending over said bead of said second metal strip.

7. A luggage case comprising upper and lower, opposed concave sections which meet at the edges thereof when the case is closed, said upper section comprising an upper concave shell having a nonmetallic exterior surface and a strip of metallic material which extends around the edge of the case section, each of the corners of said shell and said strip being rounded, said strip having an outwardly extending bead at its outer edge and an outer upwardly extending flange provided with a bead at its upper edge, the lower end of said shell being attached to the inside of said flange and said flange being provided with a shallow, longitudinally extending recess in its outer surface, said wall having an inner upwardly extending flange spaced from said outer flange and the lower edge of said upper shell being received between said outer and inner flanges, and a strip of nonmetallic material disposed in the recess in the outer surface of said outer flange; said lower case section comprising a lower strip of metallic material extending around the upper periphery of said lower case section and having an upwardly extending tongue, a wall extending outwardly from the lower edge of said tongue, said wall having an outwardly and downwardly extending bead at its outer edge, a depending flange spaced inwardly from said bead, an intermediate shell formed of a layer of metal provided with a layer of nonmetallic material on the exterior surface thereof, the upper end of said intermediate shell being attached to the outside of said depending flange and the upper edge of said intermediate shell, including said layer of nonmetallic material, extending beneath said bead, a lower concave shell having a nonmetallic exterior surface and the upper end of which is attached to the lower end of said intermediate shell, each of the corners of said lower shell, intermediate shell, and lower strip being rounded, a metal bar disposed between the lower end of said intermediate shell and the upper end of said lower shell, said bar having a flange on the inside against which the upper edge of said lower shell may abut and an outwardly extending bead at the lower end beneath which said metal and nonmetallic layers of said intermediate shell extend; a plurality of attaching devices connecting said intermediate shell, bar and lower shell together, the outer ends of said attaching devices being hidden by said nonmetallic layer of said intermediate shell; hinge means at the rear of said luggage case for pivotally connecting said sections together and disposed within a recess formed by said tongue and wall of said lower strip and said wall of said upper strip; latch means disposed in said recess at the front of said case; and handle means attached to the top of said upper case section.

8. A luggage case comprising upper and lower, opposed concave sections which meet at the edges thereof when the case is closed, said upper section comprising an upper concave shell having a non-metallic exterior surface and a strip of metallic material which extends around the edge of the case section, each of the corners of said shell and said strip being rounded, said strip having an outwardly extending wall provided with an outwardly extending bead at its outer edge and an outer upwardly extending flange provided with a bead at its upper edge, the lower end of said shell being attached to the inside of said flange and said flange being provided with a shallow, longitudinally extending recess in its outer surface, said wall having on the inside an inner, upwardly extending flange spaced from said outer flange with the lower edge of said upper shell being received between said outer and inner flanges, and a strip of nonmetallic material disposed in the recess in the outer surface of said outer flange; said lower case section comprising a strip of metallic material extending around the upper periphery of said lower case section and having an upwardly extending tongue, a wall extending outwardly from the lower edge of said tongue, said wall having an outwardly and downwardly extending bead at its outer edge, a depending flange spaced inwardly from said bead, a shell formed of metal having an upper portion provided with a layer of nonmetallic material on the exterior surface thereof, the upper end of said shell being attached to the outside of said depending flange and the upper edges of said shell and said layer of nonmetallic material extending beneath said bead, said upper portion extending downwardly from said flange to an integral, inwardly extending abutment and said shell including an integral lower portion extending around the bottom of said case section, all of the corners of said shell and strip being rounded, a layer of nonmetallic material covering the exterior surface of the lower portion of said shell, a metal bar attached to the lower portion of said shell beneath said abutment and extending around said shell, said bar having an outwardly extending bead at the lower edge beneath which said nonmetallic layer of the upper portion of said shell extends; hinge means at the rear of said luggage case for pivotally connecting said sections together and disposed within a recess formed by said tongue and said walls of said strips; latch means disposed in said recess at the front of said case; and handle means attached to the top of said upper case section.

9. A luggage case comprising upper and lower, opposed concave sections which meet at the edges thereof when the case is closed, each section including a strip formed of metallic material extending around the confronting edge of said section, said strips being constructed and arranged to inerfit when the case is closed; said lower section having a depth greater than said upper section and comprising a metal shell having an upper portion extending downwardly from said strip to an inwardly extending abutment and an integral lower portion extending around the bottom of said case section; a layer of non-metallic material extending around the lower portion of said shell and upwardly to a position adjacent said abutment; a strip of metallic material extending around said lower section below said abutment and attached to said lower section, said strip having an outwardly extending bead at its lower edge; a layer of non-metallic material extending around the upper portion of said metal shell, said bead extending over the lower edge of said non-metallic layer; hinge means at the rear pivotally connecting the case sections together; latch means at the front for connecting said sections together; and handle means attached to the top of the upper section of said case.

10. A luggage case comprising upper and lower, opposed concave sections which meet at the edges thereof when the case is closed, each said section including a strip formed of metallic material extending around the confronting edge of said section, said strips being constructed and arranged to interfit when the case is closed; said lower section having a depth greater than the upper section and comprising a hollow intermediate shell formed of a layer of metal provided with a layer of non-metallic material on the exterior surface thereof, a lower shell having non-metallic material as the exterior surface thereof and a bar extending around said case section at the junction of said intermediate and lower shells and attached thereto; hinge means at the rear pivotally connecting the case sections together; latch means at the front for connecting said sections; and handle means attached to the top of the upper section of said case.

References Cited in the file of this patent

UNITED STATES PATENTS

| | | |
|---|---|---|
| 1,377,846 | Megley | May 10, 1921 |
| 2,339,907 | Bracken | Jan. 25, 1944 |
| 2,454,366 | Worley | Nov. 23, 1948 |
| 2,510,643 | Long | June 6, 1950 |
| 2,771,167 | Lifton | Nov. 20, 1956 |
| 2,832,448 | Axtell | Apr. 29, 1958 |
| 2,872,029 | Cart | Feb. 3, 1959 |
| 2,877,151 | Doherty | Mar. 10, 1959 |
| 2,903,105 | Harvey | Sept. 8, 1959 |
| 2,950,792 | Axtell | Aug. 30, 1960 |

FOREIGN PATENTS

| | | |
|---|---|---|
| 668,371 | France | July 9, 1929 |

UNITED STATES PATENT OFFICE
CERTIFICATE OF CORRECTION

Patent No. 3,029,915            April 17, 1962

Willard G. Axtell

It is hereby certified that error appears in the above numbered patent requiring correction and that the said Letters Patent should read as corrected below.

Column 5, line 21, strike out "may"; column 7, line 75, after "having" insert -- an outwardly extending wall provided with --; column 9, line 25, for "inerfit" read -- interfit --.

Signed and sealed this 14th day of August 1962.

(SEAL)
Attest:

ERNEST W. SWIDER
Attesting Officer

DAVID L. LADD
Commissioner of Patents